United States Patent [19]

Zirngiebl

[11] 4,082,631
[45] Apr. 4, 1978

[54] ABSORPTION OF CHLORINE GAS

[75] Inventor: Eberhard Zirngiebl, Cologne, Germany

[73] Assignee: Bayer Aktiengesellschaft, Leverkusen, Germany

[21] Appl. No.: 724,121

[22] Filed: Sep. 17, 1976

[30] Foreign Application Priority Data

Oct. 9, 1975 Germany .......................... 2545342

[51] Int. Cl.² ............................................ C25B 1/26
[52] U.S. Cl. ..................................... 204/128; 55/37
[58] Field of Search ............................ 55/37; 204/128

[56] References Cited

U.S. PATENT DOCUMENTS

| 1,891,974 | 12/1932 | Fischer | 204/128 |
| 3,635,804 | 1/1972 | Gritzner et al. | 204/128 |

FOREIGN PATENT DOCUMENTS

| 455,649 | 11/1965 | Japan | 204/128 |
| 4,517,882 | 12/1965 | Japan | 204/128 |

OTHER PUBLICATIONS

"Recovery of Cl, from Waste Gas-Fundamentals", by Hine et al., J. E.C.S., 8/1972, pp. 1057-1060.
Gmelin's Handbuch der Anorganischen Chemie, 8th ed., Fe, Part B, #59; p. 271, 1932.

Primary Examiner—R. L. Andrews
Attorney, Agent, or Firm—Burgess, Dinklage & Sprung

[57] ABSTRACT

A process for the absorption of chlorine from a chlorine-containing gas, comprising contacting the chlorine-containing gas with an aqueous solution containing about 1 to 400 g/l of iron(II) chloride and at least one of copper (I) and copper(II) ions, the chlorine being adsorbed with conversion of the iron(II) chloride into iron(III) chloride, thereafter electrolyzing the iron(III) chloride to form chlorine and iron(II) chloride and recycling the iron(II) chloride for the absorption of additional chlorine. Advantageously the chlorine-containing gas has a chlorine content of from about 10 to 20% by volume, the iron(II) chloride solution contains about 0.1 to 10 g/l of at least one of $CuCl_2$ and $CuCl$, and the contact of the chlorine-containing gas with the iron(II) chloride soluton is carried out at a temperature of from about 40° to 50° C and under a pressure of the order of about 1 bar. The electrolytic reaction of the iron(III) chloride is desirably carried out using a cathode of graphite and an anode of activated titanium at a current of about 25 A and at a voltage of about 7V, the cathode compartment and the anode compartment being separated from one another by a membrane of a fluorine plastic with grafted-on sulphonic acid groups.

6 Claims, 1 Drawing Figure

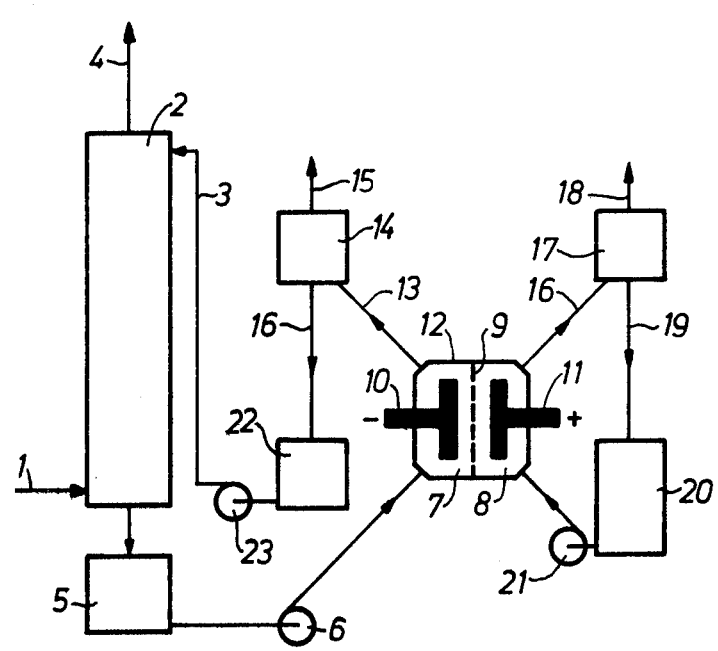

ABSORPTION OF CHLORINE GAS

In the liquefaction of chlorine, a residual gas containing in addition to chlorine other acid gases, for example carbon dioxide, is generally obtained. The composition of this residual gas is generally as follows: 5 to 20% by volume of chlorine, 10 to 30% by volume of carbon dioxide and 50 to 85% by volume of residual gases, particularly hydrogen and oxygen or nitrogen. Of the gases present in this residual gas, the chlorine has to be absorbed before a chlorine-free gas can be emitted. It is known that sodium hydroxide solution can be used for this purpose (J. S. Scones, Chlorine, Its Manufacture, Properties and Uses, Reinhold Publ. Cor. 1962, pages 70 et seq). In this case, a bleaching liquor is obtained which may be used in this form, for example for bleaching purposes, or which may again be reacted with sulphuric acid to form chlorine. In this known process, however, the carbon dioxide additionally consumes sodium hydroxide solution to form carbonate. It is only when the accumulation of chlorine-containing gases is substantially constant in regard to quantity and composition that it is possible to absorb the chlorine so that the carbon dioxide is not absorbed by the sodium hydroxide solution. Hitherto, fluctuating quantities of chlorine and exhaust gases have usually necessitated total absorption in sodium hydroxide solution.

It is also known that iron(II)chloride can be oxidized with chlorine to form iron(III)chloride. However, this reaction is slow and only takes place at a sufficient velocity with certain concentrations. Thus, it is known that chlorine is absorbed relatively slowly by an aqueous iron(II)chloride solution and most readily by a moderately concentrated, heated solution (Gmelin, System No. 59, Fe B, page 241).

The object of the present invention is to absorb chlorine substantially selectively from acid gases preferably containing dioxide and subsequently to recover the chlorine in pure form.

The present invention provides a process for the absorption of chlorine from chlorine-containing gases, characterized by the fact that a chlorine-containing gas is intensively contacted with an aqueous solution containing iron(II)chloride in a concentration of about 1 to 400 g/l in the presence of copper (I) and/or copper (II) ions, chlorine being absorbed and the iron(II)chloride being converted into iron(III)chloride, after which the iron(III)chloride formed is reacted electrolytically to form chlorine together with iron(II)chloride which is recycled for the absorption of chlorine.

It has been found that a solution containing iron(II)chloride in concentrations of about 1 to 400 g/l, preferably about 50 to 400 g/l and, with particular preference, about 300 to 400 g/l is able in the presence of copper ions to absorb chlorine substantially quantitatively and very quickly, even in the presence of acid gases such as carbon dioxide for example. The composition of the chlorine-containing gases may vary within wide limits, their chlorine content amounting to between about 1 and 50% by volume and preferably to between about 10 and 20% by volume, based on the total gas. The chlorine-containing gas may contain other constituents, for example, carbon dioxide, nitrogen, oxygen, especially hydrogen and noble gases in virtually any composition. It has surprisingly been found that the reaction of iron-(II)chloride with chlorine is greatly accelerated by the presence of copper(I) and/or copper (II) ions. Suitable copper salts are, in particular, $CuCl_2$ and $CuCl$ which are preferably used in quantities of from about 0.1 to 10 g/l.

The temperatures for the absorption of chlorine in iron(II)chloride in accordance with the invention are in the range from about 20° to 80° C and preferably in the range from about 40° to 50° C, while the pressures are in the range from about 1 to 10 bars, preferably of the order of 1 bar.

When the chlorine-containing gas is contacted with the iron(II)chloride solution, it is important to ensure that the two are intensively mixed one with the other. This result may be achieved for example in bubble columns and packed columns, the gas and iron salt solution preferably being guided in countercurrent. It is advantageous for the chlorine-containing gas to be finely dispersed by known methods, for example through frits.

The iron(III)chloride solution formed during absorption of the chlorine may be reacted electrolytically by known methods (Gmelin's Handbuch der anorganischen Chemie, 8th Edition, Iron, Part B, System No. 59, page 271 (1932) to form $FeCl_2$-solution and chlorine.

The iron(II)chloride solution formed during electrolysis may be recycled for the absorption of chlorine. Highly pure chlorine is formed as another product of electrolysis.

One particular embodiment of the process according to the invention is described in the following with reference to the accompanying drawing which is a flow sheet of the process and in which the reference numerals used have the following meaning:

1 Feedpipe for chlorine-containing gas mixture,
2 absorption tower,
3 $FeCl_2$-feedpipes,
4 exit for chlorine-free residual gas,
5 iron(III)supply vessel,
6 catholyte pump,
7 cathode compartment,
8 anode compartment,
9 diaphragm,
10 cathode,
11 anode,
12 electrolysis cell,
13 outlet pipe for catholyte solution,
14 gas/liquid separation vessel,
15 hydrogen outlet,
16 outlet pipe for anolyte liquid,
17 gas/liquid separation vessel,
18 chlorine outlet
19 pipe for anolyte liquid,
20 analyt supply vessel
21 anolyte pump,
22 iron(II)supply vessel,
23 pump.

The process according to the invention is carried out as follows:

A chlorine-containing gaseous mixture is introduced into the absorption tower (packed column) 2 through the feedpipe 1 and frit (not shown) and is contacted in countercurrent with a solution containing iron(II)chloride, introduced through feedpipe 3, for periods of from 1 to 10 minutes. Chlorine-free residual gas escapes through the outlet pipe 4. The partially or completely oxidized absorption liquid is introduced through the supply vessel 5 and the pump 6 into the cathode compartment 7 of the electrolysis cell 12. On the cathode 10 which consists of graphite iron(III)chloride is reduced into iron(II)chloride. The reduced iron salt catholyte solution is introduced through the pipe 13 into the gas/liquid separation vessel 14 and is separated from traces of hydrogen gas which escapes through 15. The reduced iron salt solution flows back into the absorption tower through the buffer vessel 22 and the pump 23.

Chlorine is given off at the titanium anode 11. The anolyte liquid is introduced into the gas/liquid separation vessel 17 through the pipe 16 and chlorine, which escapes through 18, is separated off. The anolyte liquid flows through the pipe 19 through a liquid container 20 and the anolyte pump 21 back into the anode compartment 8. The cathode compartment and anode compartment are separated by a diaphragm consisting of a fluorinated plastic membrane with ion exchanger properties.

It has been found to be advantageous to keep the catholyte and anolyte completely separate from one another in order to avoid any undesirable oxidation of the iron(II)chloride formed at the cathode. A certain amount of catholyte merely has to be transferred periodically to the anode side because, in cases where a cation exchanger membrane is used, solvent is transferred by ion migration from the anode compartment to the cathode compartment.

By virtue of the process according to the invention it is possible to separate acid gas constituents in a exhaust gas, which are present in addition to chlorine, from the chlorine because they do not react with the absorption liquid. No carbon dioxide, nitrogen oxide or similar acid gases are taken up. Apart possibly from a small amount of $FeCl_3$-solution in the form of a spray, which can be prevented by simple means, the exhaust gases do not contain any chlorine after absorption. The iron(II)absorption solution consumed is regenerated again substantially quantitatively at the cathode. The chlorine generated at the anode is highly pure.

The process according to the invention is further illustrated by the following example:

EXAMPLE 0.2 $m^3$/h of gas, containing 5% by volume of chlorine and 95% by volume of air, was treated with an absorption liquid containing approximately 127 g of $FeCl_3$, 36 g of $FeCl_2$ and 0.5 g dissolved Cu per liter in an absorption tower 2 as shown in the FIGURE. The average residence time in the absorption tower was between 1 and 2 minutes.

The oxidized absorption liquid, containing 163 g/liter of Fe(III), 353 g/liter of $Cl^-$, 45.6 g/liter of HCl and 0.5 g/liter of $Cu^{2+}$, was delivered to the cathode compartment of the electrolysis cell 12 through the catholyte pump 6. A membrane of a fluorine plastic with grafted-on sulphonic acid groups having ion exchanger properties (Nafion$^{(R)}$) was used as the diaphragm 9. A graphite plate was used as the cathode 10, while a similar plate of activated titanium (platinum metal coating approximately 1 micron thick) was used as the anode. The anode side was initially charged with the same solution which was also introduced into the cathode compartment. The ratio by volume of the catholyte solution to the anolyte solution amounted to approximately 3:2. Electrolysis itself was carried out at about 25 amps (corresponding to 36 amps/$dm^2$). After an electrolysis time of about 1 hour, during which about 53 g of Fe(II) were formed on the cathode side and the corresponding quantity of chloride on the anode side, the catholyte solution was returned to the absorption tower through 13, 14, 22 and 23. The voltage of the electrolysis cell amounted to approximately 7 volts. There was no significant evolution of hydrogen on the cathode side. The anode gas consisted of highly pure chlorine.

It will be appreciated that the instant specification and examples are set forth by way of illustration and not limitation, and that various modifications and changes may be made without departing from the spirit and scope of the present invention.

What is claimed is:

1. A process for the absorption of chlorine from a chlorine-containing gas, comprising contacting the chlorine-containing gas with an aqueous solution containing about 1 to 400 g/l of iron(II)chloride and about 0.1 to 10 g/l of a salt of at least one of copper(I) and copper(II), the chlorine being absorbed by conversion to chloride ion and with conversion of the iron(II)chloride into iron(III)chloride, thereafter electrolyzing the iron(III)chloride to form chlorine and iron(II)chloride and recycling the iron(II)chloride for the absorption of additional chlorine.

2. A process as claimed in claim 1, wherein the chlorine-containing gas has a chlorine content of from about 1 to 50% by volume.

3. A process as claimed in claim 1, wherein the iron(II)chloride solution contains at least one of $CuCl_2$ and CuCl.

4. A process as claimed in claim 1, wherein the contact of the chlorine-containing gas with the iron(II)chloride solution is carried out at a temperature of from about 20° to 80° C and under a pressure of from about 1 to 10 bars.

5. A process as claimed in claim 1, wherein the electrolysis reaction of the iron(III)chloride is carried out using a cathode of graphite and an anode of activated titanium the cathode compartment and the anode compartment being separated from one another by a membrane of a fluorine plastic with grafted-on sulphonic acid groups.

6. A process as claimed in claim 5, wherein the chlorine-containing gas has a chlorine content of from about 10 to 20% by volume, the iron(II)chloride solution contains at least one of $CuCl_2$ and CuCl, and the contact of the chlorine-containing gas with the iron(II)chloride solution is carried out at a temperature of from about 40° to 50° C and under a pressure of the order of about 1 bar.

* * * * *